(12) United States Patent
Morimura (10) Patent No.: US 11,887,193 B2
(45) Date of Patent: Jan. 30, 2024

(54) RISK ADAPTIVE ASSET MANAGEMENT

(71) Applicant: INTERNATIONAL BUSINESS MACHINES CORPORATION, Armonk, NY (US)

(72) Inventor: Tetsuro Morimura, Shinagawa-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 17/546,564

(22) Filed: Dec. 9, 2021

(65) Prior Publication Data

US 2023/0186394 A1 Jun. 15, 2023

(51) Int. Cl.
*G06Q 40/06* (2012.01)
*G06Q 10/0833* (2023.01)
*G06N 20/00* (2019.01)

(52) U.S. Cl.
CPC ............. *G06Q 40/06* (2013.01); *G06N 20/00* (2019.01); *G06Q 10/0833* (2013.01)

(58) Field of Classification Search
None
See application file for complete search history.

(56) References Cited

U.S. PATENT DOCUMENTS

| 10,140,661 | B2 | 11/2018 | Gerber | |
| 10,860,920 | B2 * | 12/2020 | Gendron-Bellemare | G06N 3/08 |
| 11,663,475 | B2 * | 5/2023 | Budden | G06N 3/006 706/23 |

(Continued)

FOREIGN PATENT DOCUMENTS

| AU | 2019203798 A1 * | 6/2019 | ............ G06Q 10/06 |
| EP | 3701432 A1 * | 9/2020 | ............... G06N 3/04 |
| WO | WO-2021243568 A1 * | 12/2021 | ......... G01C 21/3438 |

OTHER PUBLICATIONS

Mell et al., "The NIST Definition of Cloud Computing", National Institute of Standards and Technology, Special Publication 800-145. Sep. 2011, pp. 1-7.

(Continued)

*Primary Examiner* — Paul S Schwarzenberg
(74) *Attorney, Agent, or Firm* — Tutunjian & Bitetto, P.C.; Robert Richard Aragona (57) ABSTRACT

A computer-implemented method is provided for determining an action with respect to a given portfolio of items for supply chain management. The method includes acquiring, by a hardware processor, a feature vector for supply chain delivery trends, the given portfolio, and a current investment amount. The method further includes determining, by the hardware processor, whether a current supply chain delivery situation is normal or abnormal based on the feature vector. The method also includes performing a risk-avoidance action to reduce the current investment amount and avoid potential supply chain delivery losses, responsive to a determination that the current supply chain delivery situation is abnormal. The method additionally includes performing a risk adaptive action to increase the current investment amount and incur potential supply chain delivery gains by using a distributional reinforcement learning process, responsive to a determination that the current supply chain delivery situation is normal.

24 Claims, 7 Drawing Sheets

(56) References Cited

U.S. PATENT DOCUMENTS

| | | | |
|---|---|---|---|
| 2014/0164288 A1 | 6/2014 | Present et al. | |
| 2017/0213288 A1 | 7/2017 | Zhang et al. | |
| 2018/0197129 A1* | 7/2018 | Appel ............. | G06Q 10/06315 |
| 2020/0372580 A1 | 11/2020 | Yang | |
| 2022/0187847 A1* | 6/2022 | Cella ................ | G05B 19/41885 |
| 2022/0374705 A1* | 11/2022 | Hoel ........................ | G06N 3/08 |

OTHER PUBLICATIONS

Anonymous. "Methodology for Adaptive Financial Planning Based upon Temporal Spending Patterns", An IP.com Prior Art Database Technical Disclosure, ip.com. Apr. 26, 2007, pp. 1-4.
Johnson, Matthew, et al. "Bayesian Nonparametric Hidden Semi-Markov Models", Journal of Machine Learning Research. Feb. 2013, pp. 1-29.
Choueifaty, Yves, et al. "Toward Maximum Diversification", The Journal of Portfolio Management. Oct. 31, 2008, pp. 40-51.
Qian, Edward, et al. "Risk Parity Portfolios: Efficient Portfolios Through True Diversification", Panagora. Sep. 2005, pp. 1-6.
Morimura, Tetsuro, et al. "Parametric Return Density Estimation for Reinforcement Learning", arXiv preprint arXiv:1203.3497. Mar. 15, 2012, pp. 1-8.

\* cited by examiner

RISK ADAPTIVE ASSET MANAGEMENT

BACKGROUND

The present invention generally relates to asset management, and more particularly to risk adaptive asset management.

In financial multi-asset (portfolio) management, balancing of risk-aversion and seeking is a key to achieving good investment performance.

Risk-aversion is important in asset management, but it sometimes makes the return very small. Risk-seeking is usually dangerous, but it could lead to higher profit.

While several good portfolio strategies, such as risk parity and maximum diversification, have been proposed, adaptive control of investment amount has not been well studied, let alone under various conditions such as under supply chain delivery constraints.

SUMMARY

According to aspects of the present invention, a computer-implemented method is provided for determining an action with respect to a given portfolio of items for supply chain management. The method includes acquiring, by a hardware processor, a feature vector for supply chain delivery trends, the given portfolio, and a current investment amount. The method further includes determining, by the hardware processor, whether a current supply chain delivery situation is normal or abnormal based on the feature vector. The method also includes performing a risk-avoidance action to reduce the current investment amount and avoid potential supply chain delivery losses, responsive to a determination that the current supply chain delivery situation is abnormal. The method additionally includes performing a risk adaptive action to increase the current investment amount and incur potential supply chain delivery gains by using a distributional reinforcement learning process, responsive to a determination that the current supply chain delivery situation is normal.

According to other aspects of the present invention, a computer program product is provided for determining an action with respect to a given portfolio of items for supply chain management. The computer program product includes a non-transitory computer readable storage medium having program instructions embodied therewith. The program instructions are executable by a computer to cause the computer to perform a method. The method includes acquiring, by a hardware processor, a feature vector for supply chain delivery trends, the given portfolio, and a current investment amount. The method further includes determining, by the hardware processor, whether a current supply chain delivery situation is normal or abnormal based on the feature vector. The method also includes performing, by the hardware processor, a risk-avoidance action to reduce the current investment amount and avoid potential supply chain delivery losses, responsive to a determination that the current supply chain delivery situation is abnormal. The method additionally includes performing, by the hardware processor, a risk adaptive action to increase the current investment amount and incur potential supply chain delivery gains by using a distributional reinforcement learning process, responsive to a determination that the current supply chain delivery situation is normal.

According to yet other aspects, a computer-implemented method is provided for determining an action with respect to a given portfolio of items for supply chain management. The method includes acquiring, by a hardware processor, a feature vector for supply chain delivery trends, the given portfolio, a ratio of missed deliveries versus scheduled deliveries and a current investment amount. The method further includes determining, by the hardware processor, whether a current supply chain delivery situation is normal or abnormal based on the feature vector. The method also includes performing a risk-avoidance action to reduce the current investment amount and avoid potential supply chain delivery losses, responsive to a determination that the current supply chain delivery situation is abnormal. The method additionally includes performing a risk adaptive action to increase the current investment amount and incur potential supply chain delivery gains by using a distributional reinforcement learning process, responsive to a determination that the current supply chain delivery situation is normal.

According to still further aspects of the present invention, a computer program product is provided for determining an action with respect to a given portfolio of items for supply chain management. The computer program product includes a non-transitory computer readable storage medium having program instructions embodied therewith. The program instructions are executable by a computer to cause the computer to perform a method. The method includes acquiring, by a hardware processor, a feature vector for supply chain delivery trends, the given portfolio, a ratio of missed deliveries versus scheduled deliveries and a current investment amount. The method further includes determining, by the hardware processor, whether a current supply chain delivery situation is normal or abnormal based on the feature vector. The method also includes performing a risk-avoidance action to reduce the current investment amount and avoid potential supply chain delivery losses, responsive to a determination that the current supply chain delivery situation is abnormal. The method additionally includes performing a risk adaptive action to increase the current investment amount and incur potential supply chain delivery gains by using a distributional reinforcement learning process, responsive to a determination that the current supply chain delivery situation is normal.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to risk adaptive asset management.

At least some embodiments of the present invention address the sequential decision-making problem of investment amount given a portfolio. In an embodiment, the input is a feature vector for market trends, portfolio, and current investment amount, and the output is a delta of investment amount. The output can further include actions including, but not limited to, buying, selling, freezing a current capability to, e.g., buy or sell to limit undesirable market exposure, and so forth.

At least some embodiments of the present invention involve the concept that is a current investment situation is abnormal, then an action that reduces the investment amount will be taken. Otherwise, a risk adaptive action or an action for full investment can be taken.

At least some embodiments of the present invention involve the concept of a risk adaptive policy choosing an action selection criterion according to a current investment amount.

At least some embodiments of the present invention can be used to manage inventories based on features (price, expiration date, hours used so far of its lifetime, and so forth) of the inventory to determine whether to sell the inventory, hold the inventory, discard the inventory (e.g., the milk has passed its expiration date, the chip is about to fail based on hours of use, etc.), replace the inventory (e.g., the processor, memory, or other element has been flagged as about to have an impending failure, and so forth.

The features are not limited to pecuniary related features.

The features can be for a computer processing system element prone to failure, server farm components, assembly line components, food and other perishables, and so forth.

Feature can include typical longevity, hours in use, number of errors per given time frame, and so forth.

Embodiments of the present invention relate to a risk adaptive management approach for any asset, where an asset is considered as one or more items constituting a position in those items. A position in the realm of finance refers to the amount of a particular security, commodity, or currency owned by an entity. Such items can be stocks, mutual funds, currency, and so forth. Such items can be physical items having, for example, a finite number of life cycles, and so forth, where the asset is managed to maximize the number of life cycles (maximize the useful time prior to a defective or otherwise non-operational state).

Figure 1:
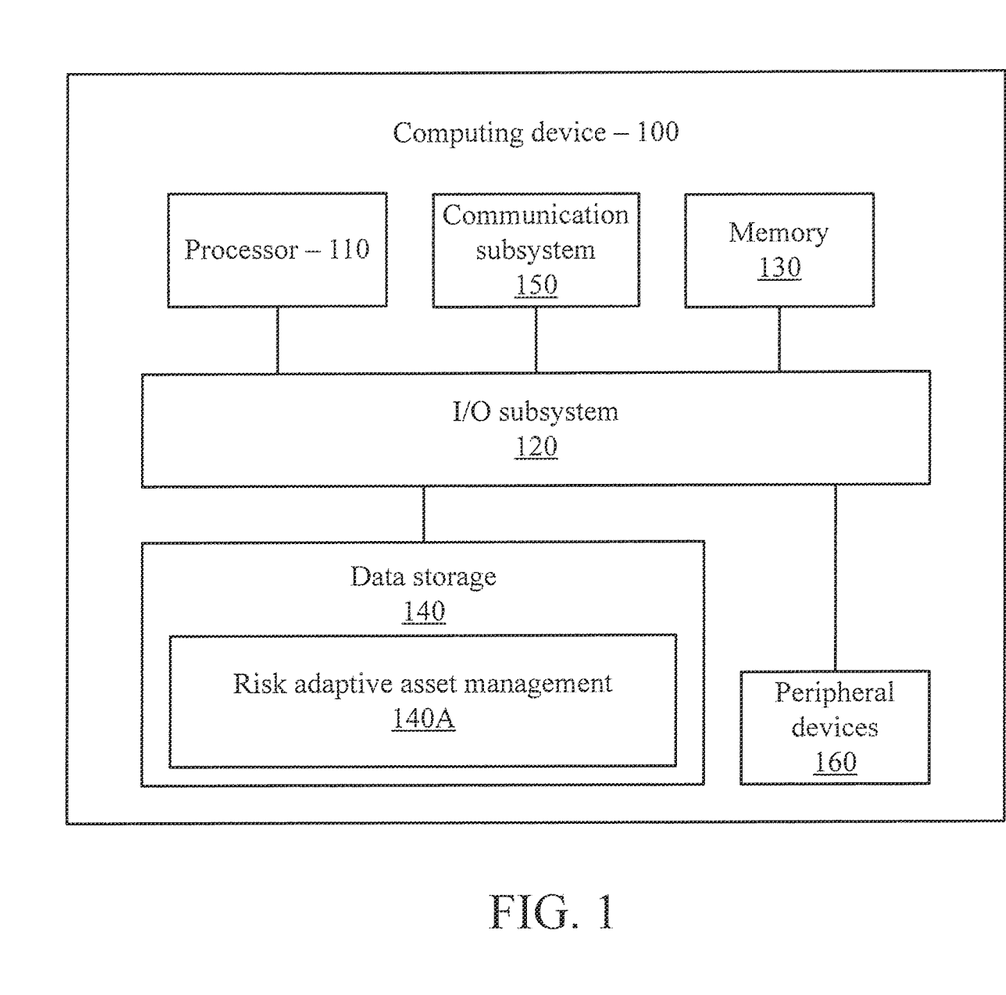
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform risk adaptive asset management.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for risk adaptive asset management. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
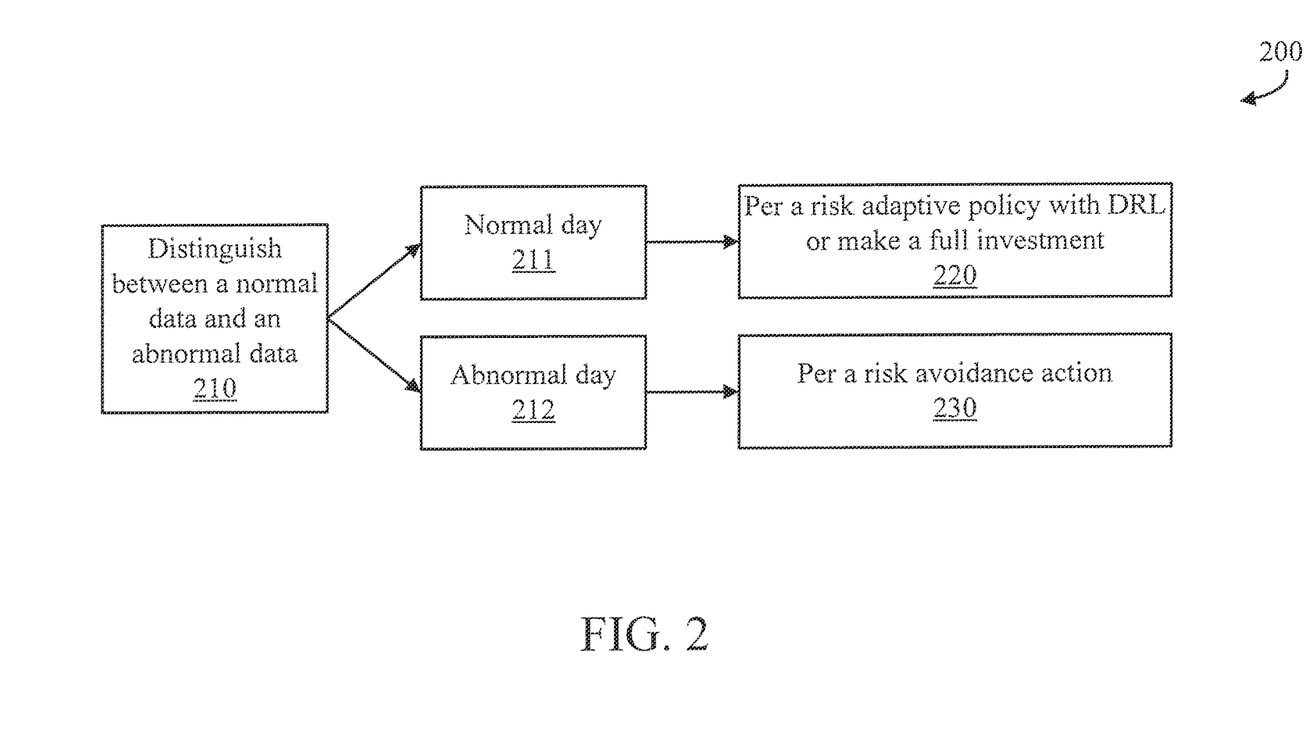
FIG. 2 is a flow diagram showing an exemplary flow for risk adaptive asset management, in accordance with an embodiment of the present invention.

These and other variations of a hardware processor subsystem are also contemplated in accordance with embodiments of the present invention FIG. 2 is a flow diagram showing an exemplary flow 200 for risk adaptive asset management, in accordance with an embodiment of the present invention.

At block 210, distinguish between a normal day 211 and an abnormal day 212.

At block 220, perform a risk adaptive policy with Distributed Reinforcement Learning (DRL) or make a full investment (increase the investment amount to a maximum investment amount).

At block 230, perform a risk avoidance action (e.g., make the investment small if at all).

Figure 3:
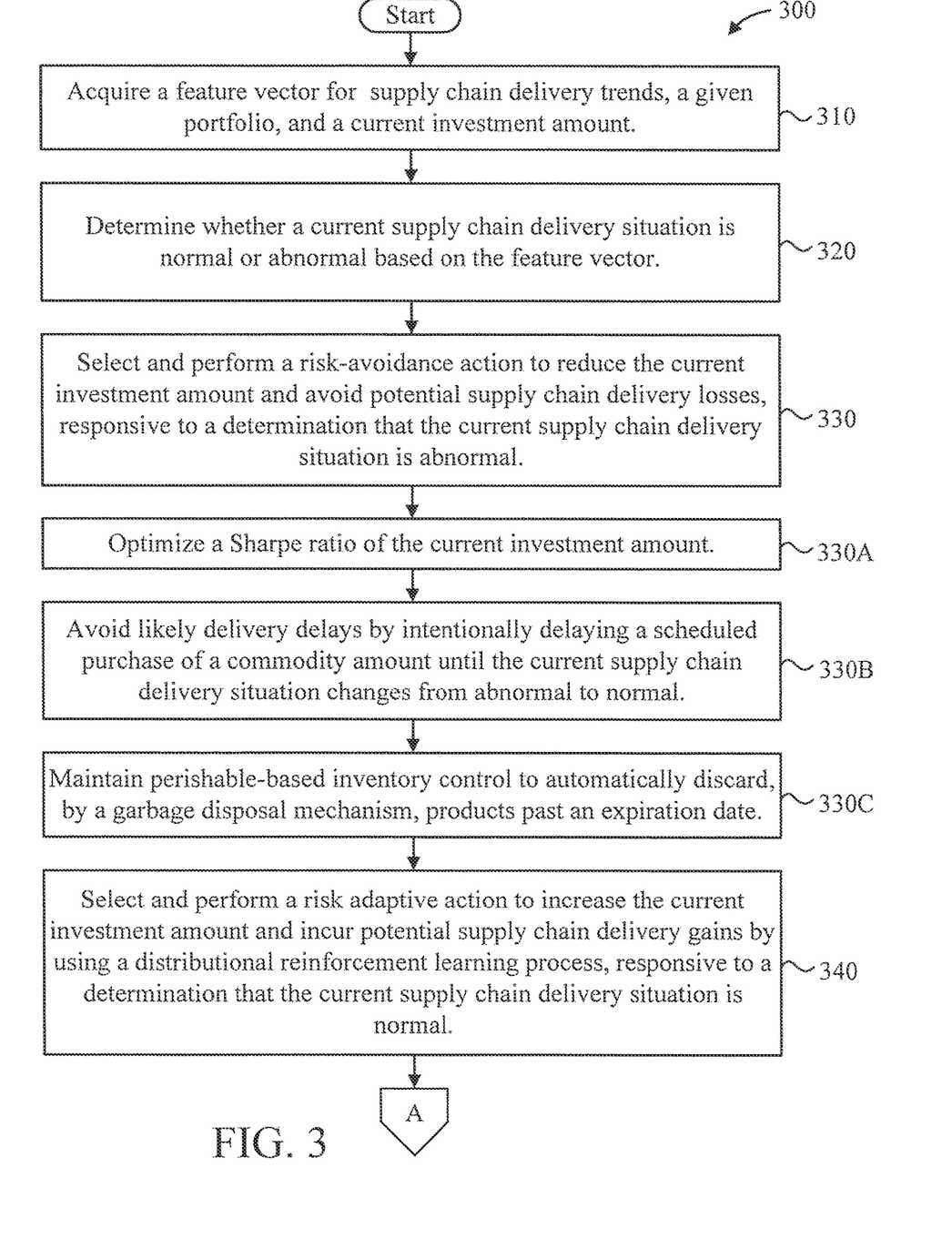
FIGS. 3-4 are flow diagrams showing an exemplary method for risk adaptive asset management, in accordance with an embodiment of the present invention.
Figure 4:
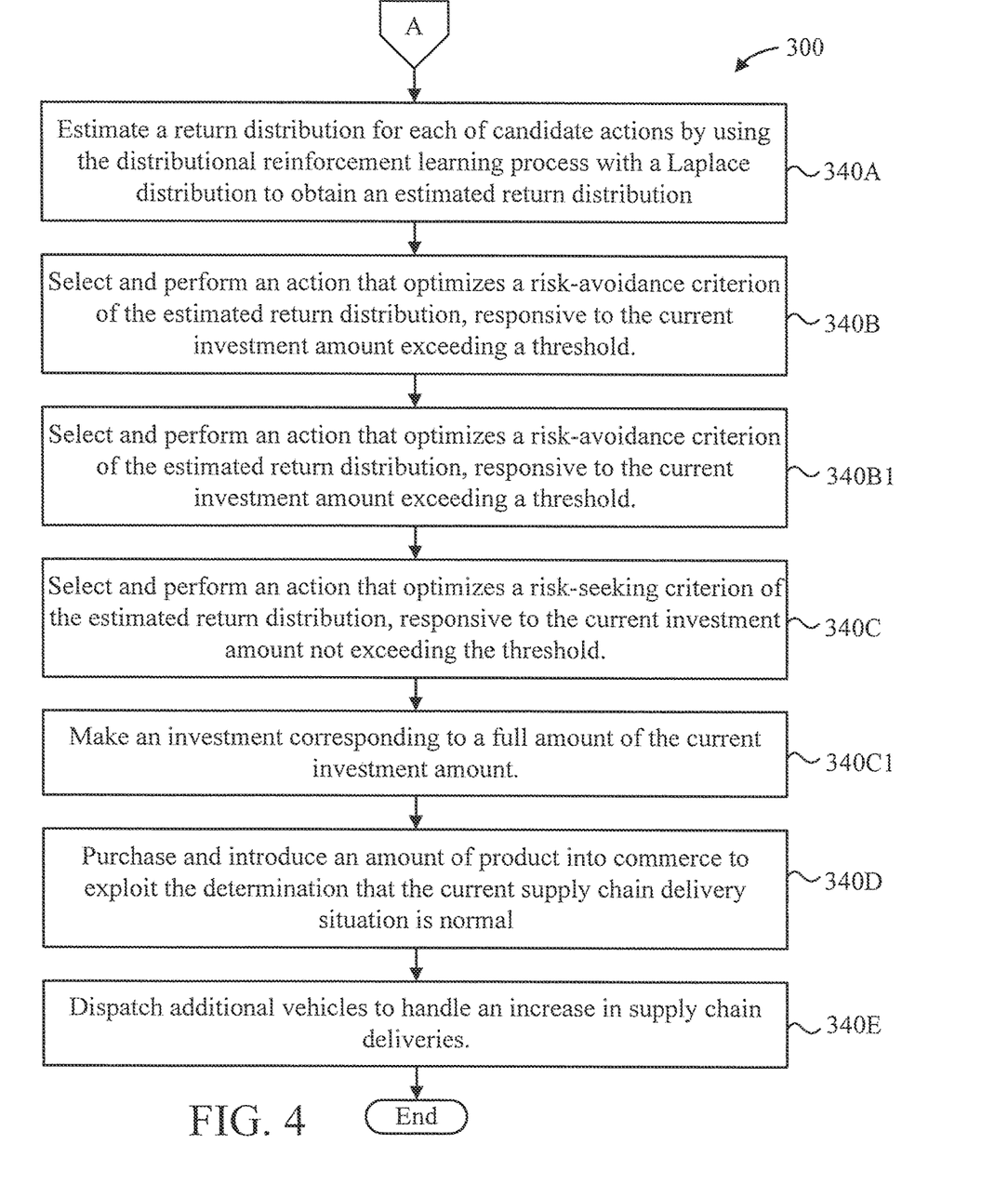

FIGS. 3-4 are flow diagrams showing an exemplary method 300 for risk adaptive asset management, in accordance with an embodiment of the present invention.

At block 310, acquire a feature vector for supply chain delivery trends, a given portfolio, and a current investment amount.

At block 320, determine whether a current supply chain delivery situation is normal or abnormal based on the feature vector. Considerations can include, but are not limited to, weather, available drivers, available vehicle, current vehicle states (operational, non-operational, requiring maintenance, etc.), road conditions, road repair schedules, and so forth.

At block 330, select and perform a risk-avoidance action to reduce the current investment amount and avoid potential supply chain delivery losses, responsive to a determination that the current supply chain delivery situation is abnormal.

In an embodiment, block 330 can include one or more of blocks 330A through 330C.

At block 330A, optimize a Sharpe ratio of the current investment amount.

At block 330B, avoid likely delivery delays by intentionally delaying a scheduled purchase of a commodity amount until the current supply chain delivery situation changes from abnormal to normal.

At block 330C, maintain perishable-based inventory control to automatically discard, by a garbage disposal mechanism, products (e.g., dairy, meat, etc.) past an expiration date. In an embodiment, the automatic garbage disposal mechanism is a processor-based machine having a camera and a text reader to read expiration dates on products to determine if they are past their expiration date.

At block 340, select and perform a risk adaptive action to increase the current investment amount and incur potential supply chain delivery gains by using a distributional reinforcement learning process, responsive to a determination that the current supply chain delivery situation is normal.

In an embodiment, block 340 can include one or more of blocks 340A through 340E.

At block 340A, estimate a return distribution for each of candidate actions by using the distributional reinforcement learning process with a Laplace distribution to obtain an estimated return distribution. Estimating a return distribution for each of candidate actions by using the distributional reinforcement learning process with a Laplace distribution involves learning parameters of the Laplace distribution model with return samples.

At block 340B, select and perform an action that optimizes a risk-avoidance criterion of the estimated return distribution, responsive to the current investment amount exceeding a threshold.

In an embodiment, block 340B can include block 340B1.

At block 340B1, make an investment corresponding to a fraction of the current investment amount corresponding to a given maximum acceptable loss amount.

At block 340C, select and perform an action that optimizes a risk-seeking criterion of the estimated return distribution, responsive to the current investment amount not exceeding the threshold.

In an embodiment, block 340C can include block 340C1.

At block 340C1, make an investment corresponding to a full amount of the current investment amount.

At block 340D, purchase and introduce an amount of product into commerce to exploit the determination that the current supply chain delivery situation is normal.

At block 340E, dispatch additional vehicles to handle an increase in supply chain deliveries. The vehicles can be autonomous vehicles. Dispatching vehicles leads to accident exposure and other risk-seeking behavior versus a parked delivery vehicle. The vehicles can be dispatched in inclement weather to increase a number of deliveries in a given time over a given weather condition. The present invention can involve controlling the autonomous vehicles while making deliveries and/or otherwise using the supply chain. Such control can involve the steering system, braking system, accelerating system, lighting system, and/or so forth of the vehicle.

In an embodiment, method 300 can include avoiding likely delivery delays by intentionally delaying a scheduled purchase of a commodity amount until the current supply chain delivery situation changes from abnormal to normal to minimize a time in transit.

In an embodiment, the selecting and performing an action that optimizes a risk-seeking criterion can include dispatching a fleet of autonomous vehicles in an inclement weather situation to attempt to make at least some deliveries, for example, for medically necessary items (food, medicine).

Figure 5:
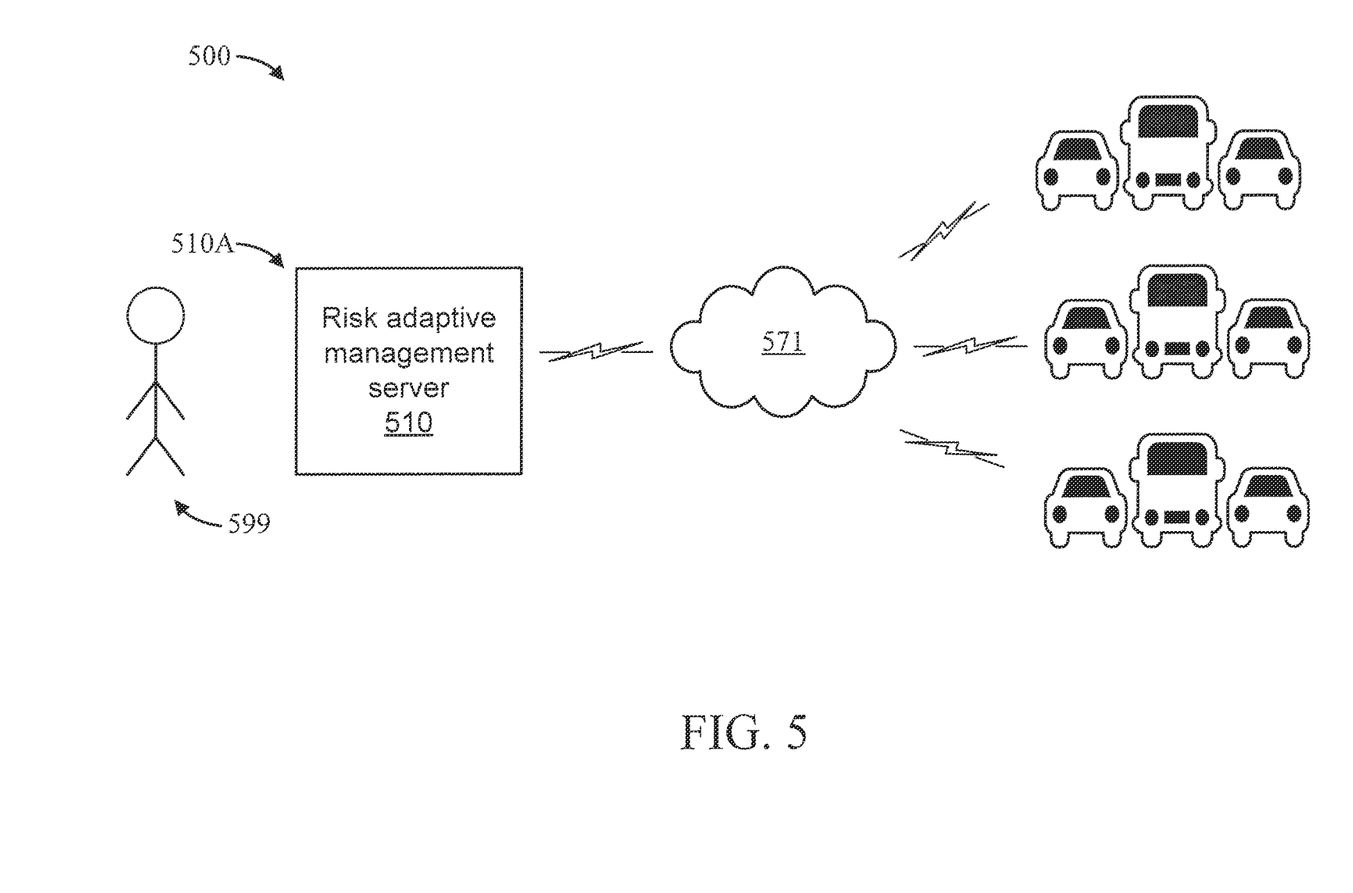
FIG. 5 is a block diagram showing an exemplary environment for risk adaptive asset management, in accordance with an embodiment of the present invention.

FIG. 5 is a block diagram showing an exemplary environment 500 for risk adaptive asset management, in accordance with an embodiment of the present invention.

The environment 500 includes a risk adaptive asset management server 510. The risk adaptive asset management server 510 is configured to perform risk adaptive asset management. The risk adaptive asset management server 510 can involve a cloud configuration where the server is located in the cloud. Various different cloud configurations are disclosed herein which can be used in accordance with the teachings of the present invention.

The environment 500 further includes a fleet of autonomous delivery service vehicles 520 in wireless signal communication with the server 510 over one or more networks 571. Vehicles in the fleet of autonomous delivery service vehicles are dynamically capable of being dispatched responsive to an action determination, in turn, responsive to a determination of whether a current supply chain delivery situation is normal or abnormal based on a feature vector. The feature vector can include information relating to, and/or otherwise capable of affecting, the current supply chain delivery situation such as supply chain delivery trends, the given portfolio, a ratio of missed deliveries versus scheduled deliveries, an amount of available inventory, an amount of contracted for inventory, a current investment amount, fleet status, weather, and so forth. A closest cloud node, as that changes over time with respect to multiple dispersed cloud nodes, can be used to track vehicles based on, e.g., signal strength, as they delivery products.

Thus, for the step of selecting and performing a risk adaptive action, the server 510, reacts to orders by dispatching autonomous vehicles as needed/expected in response to determined actions.

The server 510 increases or decreases up to eliminating orders depending on a current supply chain delivery situation being normal or abnormal, respectively. The orders can be increased or decreased relative to an intended delivery schedule that is dynamically modified to optimize the supply chain by not overloading or unloading the supply chain in order to exploit a maximum possible number of deliveries over a given time period given current conditions including fleet status (vehicle condition (e.g., brakes, gas/electricity amount in vehicle, etc.), weather (e.g., dry, snow, rain, fog, etc.), and so forth, which can also be used a portions of an input feature vector, with other features for example, from which the determination of current supply chain delivery situation being normal or abnormal is performed. While items like gas/electricity can be easily replenished, there is a time cost associated with the same that can adversely affect delivery scheduling, particularly if many vehicles are affected across a fleet.

A user 599 interfaces with the risk adaptive asset management server 510 in order to engage in risk adaptive asset management. The user 599 initiates a determination of whether the current supply chain delivery situation is normal or abnormal. This determination will control and/or otherwise limit the inputs the user can enter into a user interface in order to prohibit the user 599 from taking an action likely to lead to a poor result for the user 599 regarding risk adaptive asset management. That is, in an embodiment, a user interface 510A of the risk adaptive asset management server 510 adaptively allows or disallows certain actions from being performed responsive to a determination of whether the current supply chain delivery situation is normal or abnormal. For example, do not delivery today such that the system will not accept deliveries because there is 2 feet of snow expected or particularly bad roadway construction, and/or so forth. In this way, undesirable actions can be restricted from selection in order to optimize the current supply chain delivery situation.

Embodiments of the present invention are directed to maximizing a return, whether it be for an investment, a delivery scenario, and so forth.

There are several definitions of return, which are used in different situations. In the financial domain, the return will be how much we can earn by investment (in a specific span of time).

The average return means the expected value that can be obtained. On the other hand, standard (of the return) indicates the standard deviation or volatility of the return.

For situations where risk is not a concern, the objective function to be maximized will be the average return. In order to maximize the return while minimizing the risk, the objective function will be "average return—$\lambda$ std". This $\lambda$ is a hyper parameter, which is set by hand before learning, and adjusts the degree to which risk is considered important. For example, the larger $\lambda$, the more risk is considered.

In supply chain delivery scenarios, the return relates to the profit made on the amount of product able to be delivered in a given case. Certain scenarios (inclement (snow, heavy rain more than x inches per hour, etc.) weather, road construction, etc.) can adversely affect delivery ability and reduce the return while increasing exposure to undesirable events such as traffic/construction/weather delays, product shortages, and so forth.

A description will now be given regarding cloud computing. It is to be appreciated that in various embodiments, various functions such as autonomous vehicle control can be offloaded to the cloud, for example, such that the closest computing nodes to the autonomous vehicles control the autonomous vehicles in an efficient control scheme. Other aspects of the invention can be offloaded to the loud such as delivery scheduling, and so forth. These and other variations are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
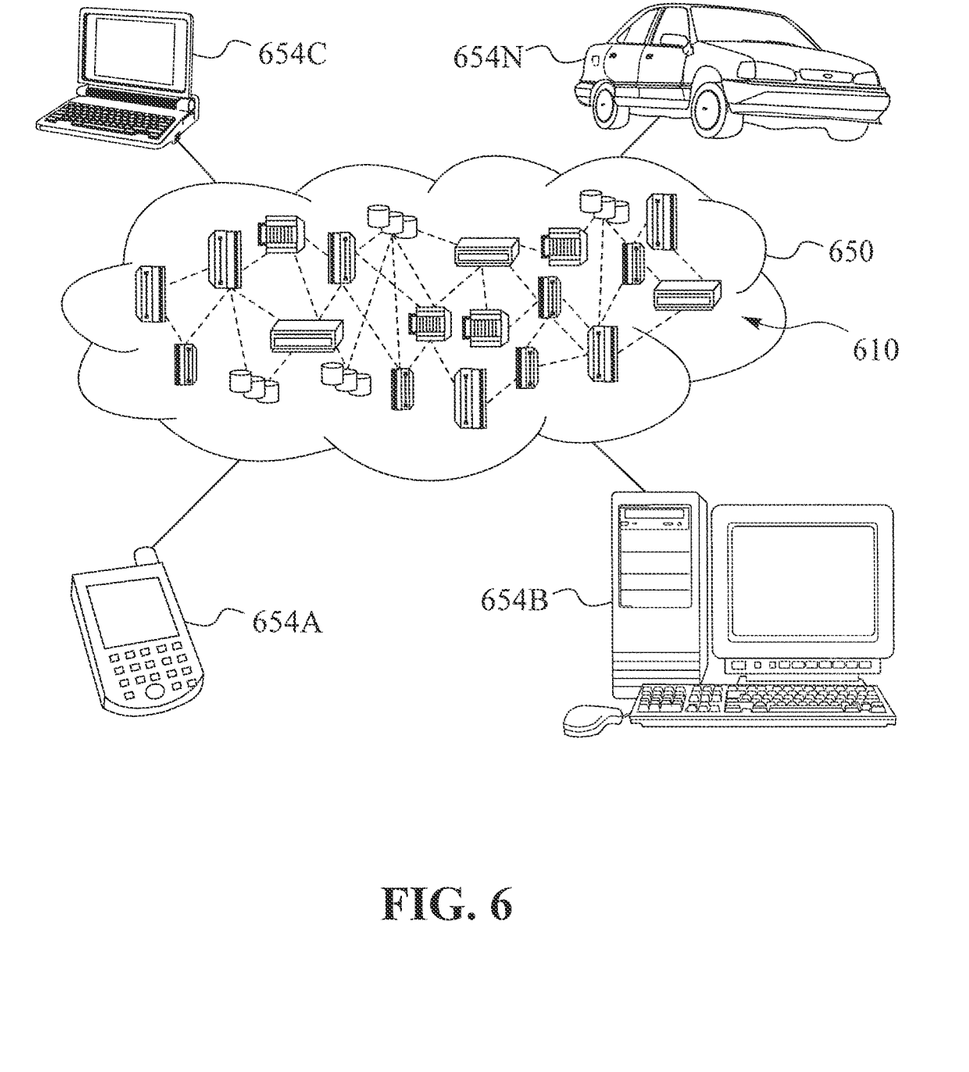
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
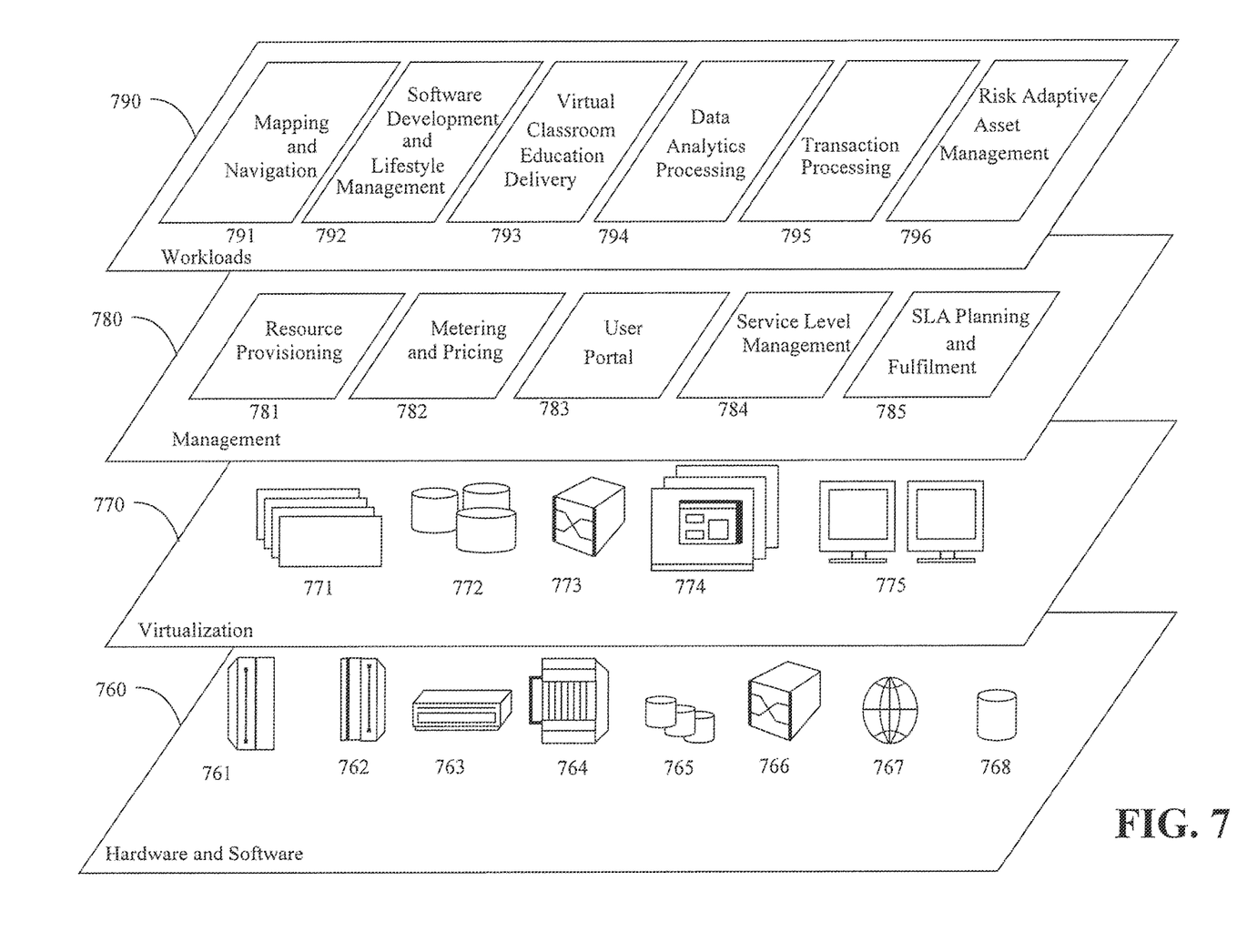
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and risk adaptive asset management 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for determining an action with respect to a given portfolio of items for supply chain management, comprising:
acquiring, by a hardware processor, a feature vector for supply chain delivery trends, the given portfolio, and a current investment amount;
determining, by the hardware processor, whether a current supply chain delivery situation is normal or abnormal based on the feature vector;
performing a risk-avoidance action to reduce the current investment amount and avoid potential supply chain delivery losses, responsive to a determination that the current supply chain delivery situation is abnormal; and
performing a risk adaptive action to increase the current investment amount and incur potential supply chain delivery gains by using a distributional reinforcement learning process, responsive to a determination that the current supply chain delivery situation is normal, including dispatching and controlling additional autonomous vehicles to handle an increase in supply chain deliveries.

2. The computer-implemented method of claim 1, wherein performing a risk adaptive action includes:
estimating a return distribution for each of candidate actions by using the distributional reinforcement learning process with a Laplace distribution to obtain an estimated return distribution;
selecting and performing an action that optimizes a risk-avoidance criterion of the estimated return distribution, responsive to the current investment amount exceeding a threshold; and
selecting and performing an action that optimizes a risk-seeking criterion of the estimated return distribution, responsive to the current investment amount not exceeding the threshold.

3. The computer-implemented method of claim 2, wherein estimating a return distribution for each of candidate actions by using the distributional reinforcement learning process with a Laplace distribution comprises learning parameters of a Laplace distribution model with return samples.

4. The computer-implemented method of claim 2, further comprising modeling a tail of the supply chain delivery trends using the Laplace distribution.

5. The computer-implemented method of claim 2, wherein performing an action that optimizes a risk-avoidance criterion of the estimated return distribution comprises making an investment corresponding to a fraction of the current investment amount corresponding to a given maximum acceptable loss amount.

6. The computer-implemented method of claim 2, wherein performing an action that optimizes risk-seeking criterion of the estimated return distribution comprises making an investment corresponding to a full amount of the current investment amount.

7. The computer-implemented method of claim 1, wherein performing a risk-avoidance action comprises optimizing a Sharpe ratio of the current investment amount.

8. The computer-implemented method of claim 1, wherein performing a risk-avoidance action comprises selecting an action that optimizes an average return–λxa standard deviation), where λ is a tunable parameter greater than 0.

9. The computer-implemented method of claim 1, further comprising avoiding likely delivery delays by intentionally delaying a scheduled purchase of a commodity amount until the current supply chain delivery situation changes from abnormal to normal to minimize a time in transit.

10. The computer-implemented method of claim 1, further comprising maintaining perishable-based inventory control to automatically discard, by a garbage disposal mechanism, products past an expiration date.

11. The computer-implemented method of claim 1, wherein performing a risk adaptive action to increase the current investment amount includes purchasing and introducing an amount of product into commerce to exploit the determination that the current supply chain delivery situation is normal.

12. The computer-implemented method of claim 1, wherein the feature vector comprises a ratio of missed deliveries versus scheduled deliveries.

13. The computer-implemented method of claim 1, wherein performing an action that optimizes a risk-seeking criterion comprises dispatching and controlling a fleet of autonomous vehicles in an inclement weather situation.

14. The method of claim 1, wherein controlling the additional autonomous vehicles includes controlling a steering system, braking system, or acceleration system of the additional autonomous vehicles.

15. A computer program product for determining an action with respect to a given portfolio of items for supply chain management, the computer program product comprising a non-transitory computer readable storage medium having program instructions embodied therewith, the program instructions executable by a computer to cause the computer to perform a method comprising:
    acquiring, by a hardware processor, a feature vector for supply chain delivery trends, the given portfolio, and a current investment amount;
    determining, by the hardware processor, whether a current supply chain delivery situation is normal or abnormal based on the feature vector;
    performing, by the hardware processor, a risk-avoidance action to reduce the current investment amount and avoid potential supply chain delivery losses, responsive to a determination that the current supply chain delivery situation is abnormal; and
    performing, by the hardware processor, a risk adaptive action to increase the current investment amount and incur potential supply chain delivery gains by using a distributional reinforcement learning process, responsive to a determination that the current supply chain delivery situation is normal, including dispatching and controlling additional autonomous vehicles to handle an increase in supply chain deliveries.

16. The computer-implemented method of claim 15, wherein performing a risk adaptive action includes:
    estimating a return distribution for each of candidate actions by using the distributional reinforcement learning process with a Laplace distribution to obtain an estimated return distribution;
    performing an action that optimizes a risk-avoidance criterion of the estimated return distribution, responsive to the current investment amount exceeding a threshold; and
    performing an action that optimizes a risk-seeking criterion of the estimated return distribution, responsive to the current investment amount not exceeding the threshold.

17. The computer-implemented method of claim 16, wherein estimating a return distribution for each of candidate actions by using the distributional reinforcement learning process with a Laplace distribution comprises learning parameters of a Laplace distribution model with return samples.

18. The computer-implemented method of claim 16, further comprising modeling a tail of the supply chain delivery trends using the Laplace distribution.

19. The computer-implemented method of claim 16, wherein performing an action that optimizes a risk-avoidance criterion of the estimated return distribution comprises making an investment corresponding to a fraction of the current investment amount corresponding to a given maximum acceptable loss amount.

20. The computer-implemented method of claim 16, wherein performing an action that optimizes risk-seeking criterion of the estimated return distribution comprises making an investment corresponding to a full amount of the current investment amount.

21. The computer-implemented method of claim 15, wherein performing a risk-avoidance action comprises optimizing a Sharpe ratio of the current investment amount.

22. The computer-implemented method of claim 15, further comprising avoiding likely delivery delays by intentionally delaying a scheduled purchase of a commodity amount until the current supply chain delivery situation changes from abnormal to normal to minimize a time in transit.

23. A computer-implemented method for determining an action with respect to a given portfolio of items for supply chain management, comprising:
    acquiring, by a hardware processor, a feature vector for supply chain delivery trends, the given portfolio, a ratio of missed deliveries versus scheduled deliveries and a current investment amount;
    determining, by the hardware processor, whether a current supply chain delivery situation is normal or abnormal based on the feature vector;
    performing a risk-avoidance action to reduce the current investment amount and avoid potential supply chain delivery losses, responsive to a determination that the current supply chain delivery situation is abnormal; and
    performing a risk adaptive action to increase the current investment amount and incur potential supply chain delivery gains by using a distributional reinforcement learning process, responsive to a determination that the current supply chain delivery situation is normal, including dispatching and controlling additional autonomous vehicles to handle an increase in supply chain deliveries.

24. A computer program product for determining an action with respect to a given portfolio of items for supply chain management, the computer program product comprising a non-transitory computer readable storage medium having program instructions embodied therewith, the program instructions executable by a computer to cause the computer to perform a method comprising:
    acquiring, by a hardware processor, a feature vector for supply chain delivery trends, the given portfolio, a ratio of missed deliveries versus scheduled deliveries and a current investment amount;
    determining, by the hardware processor, whether a current supply chain delivery situation is normal or abnormal based on the feature vector;
    performing a risk-avoidance action to reduce the current investment amount and avoid potential supply chain delivery losses, responsive to a determination that the current supply chain delivery situation is abnormal; and
    performing a risk adaptive action to increase the current investment amount and incur potential supply chain delivery gains by using a distributional reinforcement learning process, responsive to a determination that the current supply chain delivery situation is normal, including dispatching and controlling additional autonomous vehicles to handle an increase in supply chain deliveries.

* * * * *